(12) United States Patent
Frey

(10) Patent No.: US 8,663,521 B2
(45) Date of Patent: Mar. 4, 2014

(54) PROCESS FOR MANUFACTURING A LOOPED MATERIAL BAND

(75) Inventor: Pierre-Regis Frey, Lutterbach (FR)

(73) Assignee: TANALS, Masevaux (FR)

( * ) Notice: Subject to any disclaimer, the term of this patent is extended or adjusted under 35 U.S.C. 154(b) by 281 days.

(21) Appl. No.: 13/100,315

(22) Filed: May 4, 2011

(65) Prior Publication Data

US 2011/0272845 A1 Nov. 10, 2011

(30) Foreign Application Priority Data

May 10, 2010 (FR) ...................................... 10 53623

(51) Int. Cl.
*B29C 69/00* (2006.01)

(52) U.S. Cl.
USPC ................ 264/152; 264/DIG. 44; 198/844.2; 474/256

(58) Field of Classification Search
USPC .......... 474/256; 264/DIG. 44, 152; 198/844.2
See application file for complete search history.

(56) References Cited

U.S. PATENT DOCUMENTS

| | | |
|---|---|---|
| 3,744,095 A | 7/1973 | Tomlinson |
| 5,092,823 A | 3/1992 | Longo |
| 5,632,701 A * | 5/1997 | Neel .............................. 474/256 |
| 6,274,072 B1 * | 8/2001 | Naritomi ....................... 264/250 |
| 6,328,079 B1 | 12/2001 | Zils |
| 2002/0090473 A1* | 7/2002 | Lee et al. ...................... 428/35.7 |
| 2004/0199242 A1* | 10/2004 | Hong et al. ................... 623/1.16 |
| 2009/0246531 A1* | 10/2009 | Blot et al. ................... 428/411.1 |
| 2009/0301845 A1 | 12/2009 | DeGroot et al. |

FOREIGN PATENT DOCUMENTS

| | | |
|---|---|---|
| DE | 44 42 927 A1 | 6/1996 |
| DE | 10029571 A1 * | 1/2002 |
| EP | 1 085 120 A1 | 3/2001 |
| EP | 2 108 860 A2 | 10/2009 |
| WO | 2007/090148 A2 | 8/2007 |
| WO | WO 2007090148 A2 * | 8/2007 |

* cited by examiner

*Primary Examiner* — Amjad Abraham
(74) *Attorney, Agent, or Firm* — Davis & Bujold, PLLC; Michael J. Bujold

(57) ABSTRACT

A process of manufacturing a looped material band for use as a conveyor belt, a conveyor, a transmission belt or the like in which the ends of the band are assembled by fitting together two serrations that have complementary shapes and are connected by at least one transverse locking rod that is inserted through transverse openings arranged in the teeth of the serrations. The process comprises the steps of producing the transverse openings by machining the ends of the band to remove material in an area corresponding at least to the transverse openings to be produced, placing a transverse core pin in each machined area, overmolding material in the machined areas to restore the ends of the band, and one removing, after polymerization of the material, the transverse core pins that form the transverse openings.

11 Claims, 2 Drawing Sheets

PROCESS FOR MANUFACTURING A LOOPED MATERIAL BAND

This application claims priority from French patent application Ser. No. 10/53623 filed May 10, 2010.

FIELD OF THE INVENTION

The present invention relates to a process for manufacturing a looped material band such as in particular a conveyor belt, a conveyor, a transmission belt or similar, in which the ends of the band are assembled by fitting together two serrations having complementary shapes provided respectively in the plane of each of the ends, the teeth of each serration comprising at least one transversal opening that is aligned with that of the neighboring teeth, so as to define, when the serrations are fitted together, at least one transversal passage arranged for receiving a locking rod.

BACKGROUND OF THE INVENTION

A looped material band is defined as a flat strip whose ends have been assembled in order to form an endless loop. These looped material bands are used in many areas of industry as conveying elements such as a conveyor belt, a conveyor, but also as transmission elements such as a belt or similar.

Today various reversible or dismountable assembling systems for the ends of a conveyor belt exist, which allow advantageously installing such a band on a machine, replacing it, etc., without having to disassemble the machine and without the possible intervention of the manufacturer of the conveyor belt.

A solution described in document EP 1.085.120 provides junction means including a plurality of aligned eyelets, which are attached to the ends of a conveyor belt by means of staples or similar and assembled by means of a transversal rod.

Another assembly system known from document DE 4.442.927 is based on the presence of teeth integrated in the plane of the ends of a conveyor belt. The teeth are intended for being fitted into each other and are all provided with a metallic insert in which at least one assembly rod is screwed.

Such assembly means, which use essentially metallic elements, weaken the assembled ends, which are subjected to high tensions. Furthermore, these rigid metallic elements may create hazardous areas where operators and/or conveyed products may get caught. Another disadvantage is due to the fact that their presence increases the size of the conveyor belt and, consequently, the diameter when it winds around the driving rollers.

Another solution described in publication WO 2007/090148 consists in adding at each end of a conveyor belt, junction means including band sections showing serrations with complementary shapes. After fitting the serrations, one or more transversal rods passing through openings provided in each of the teeth contribute to locking the assembly. Removing the rods allows dismounting the conveyor belt. One of the disadvantages of such a configuration is due to the fact that the junction means must be connected by welding or by any similar process to the ends of the band, which leads eventually to a conveyor band having three assembly areas defining three areas of potential fragility. Furthermore, such junction means are not totally satisfactory when they are applied to bands with a reinforced structure. In fact, such an assembly system is elastic and lengthens with time. Regarding the toothed or timing belts with a positive drive, it has been noted that the pitch of the teeth lengthens locally, leading with time to a bad meshing with the pulleys. On the other hand, such junction means must imperatively be manufactured specifically for each type of conveyor belt, so that their respective features, in particular regarding the thickness, the material, the color or the possible presence of a traction core correspond. This imperative requirement is a major constraint for the conveyor belt manufacturer, who can become unable to foresee the costs and deadlines for his own customers. He is indeed subjected to the risks due to the procurement of suitable junction means, which are themselves supplied by the manufacturer of the raw material of the conveyor belt. In addition, the manufacturing process of such junction means, in which the openings for the passage of the assembly rods are drilled in the thickness of the teeth, is not only particularly tedious and delicate to carry out, but it furthermore does not allow to guarantee their perfect alignment, which is necessary for an easy and proper positioning of the rods.

SUMMARY OF THE INVENTION

The present invention aims to overcome these disadvantages by proposing a manufacturing process of a looped material band in which the junction means are directly integrated in the ends of the material band, which allows avoiding all the problems mentioned previously, which are linked to the junction elements added on the ends. Another goal of the invention is to propose a solution for providing the openings for the passage of the locking rods in a quick and accurate way, while this solution can be applied to any type of material band.

To that purpose, the invention relates to a process that includes a step in which, for producing the transversal openings, one machines the ends of the band to remove material in an area corresponding at least to the transversal openings to be produced, one places a transversal core pin in each machined area, one overmolds material in the machined areas to restore the ends of the band, and one removes, after polymerization of the material, the transversal core pins forming the transversal openings.

According to an advantageous embodiment variant, the present process is characterized in that one cuts the teeth forming the serrations after having machined the ends of the material band, one then fits the serrations into each other, and disposes the transversal core pin in the machined area, one next overmolds material in the machined area to restore the ends of the band, and then removes, after polymerization of the material, the transversal core pin forming the transversal openings and one separates the serrations.

One machines the ends of the band by trimming or using a heated blade, if need be on a width covering several rows of transversal openings to remove material on a length equal to the width I of the band.

According to another advantageous characteristic of the present process, one uses the previously removed material as material to be overmolded in the machined area.

On the other hand, to overmold material in the machined area, the present process provides locating the ends in a matrix defining the impression of the material band.

Another characteristic of the process is also defined in that one cuts the teeth forming the serrations by die-stamping, before or after the overmolding step.

According to an additional characteristic, one also separates the serrations by die-stamping. In this case, one stamps the band at the exact location where the serrations have been cut previously and using the same stamping die.

BRIEF DESCRIPTION OF THE DRAWINGS

The present invention and its advantages will be better revealed in the following description of an embodiment given as a non limiting example, in reference to the drawings in appendix, in which.

DETAILED DESCRIPTION OF THE PREFERRED EMBODIMENTS

Figure 1:
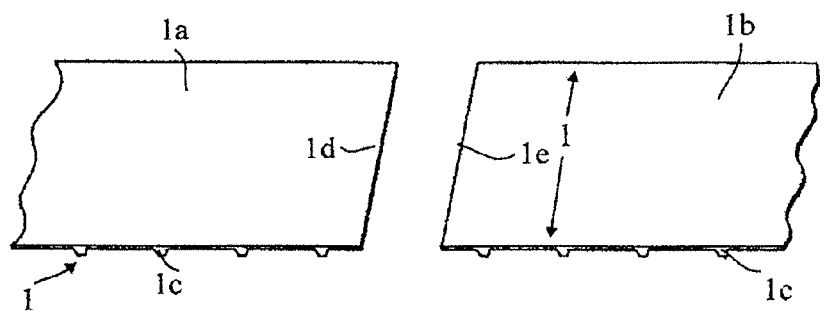
FIGS. 1 to 7 represent top views of the two ends to be assembled of a conveyor belt with ribs during the various steps of the manufacturing process according to the invention.

With reference to the figures, the present manufacturing process consists in integrating in the ends 1a, 1b of a material band, such as for example a conveyor belt 1 provided with ribs 1c, reversible junction means 2 which allows dismountable assembly of the ends for forming a looped material band. These junction means 2 comprise two serrations 2a, 2b cut in the plane of the ends 1a, 1b, having complementary shapes, arranged so as to be fitted together in the plane of the ends and locked by means of two locking rods 3 introduced transversally through a row of transversal openings 2d arranged in teeth 2c of serrations 2a, 2b. The number of locking rods 3 is of course not limited and depends mainly on the length of the serrations or on the mechanical strength required.

Figure 2:
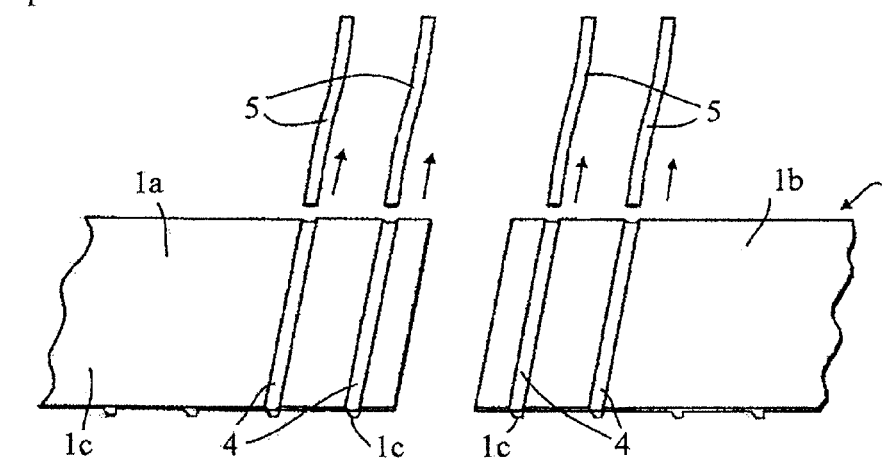

In the represented example (refer to FIG. 1), the two ends 1a, 1b show junction edges 1d, 1e, these edges being straight, that is to say perpendicular to the plane of the conveyor belt 1 and parallel with each other, in order to allow for a perfect junction. Junction edges 1d, 1e that are beveled, that is to say cut in oblique in the thickness of the conveyor belt 1 and parallel with each other could also be suitable for the implementation of the present process. As visible in FIG. 2, the first step of the process according to the invention consists in machining the ends 1a, 1b in order to remove at least one strip of material 5 in an area corresponding to the future location of at least one row of transversal openings 2d intended for the passage of a locking rod 3. In the represented example, the ends 1a, 1b have been machined so as to produce in each end two grooves 4 parallel with each other and with a length equal to the width I of the conveyor belt 1. Their location is preferably chosen according to the nature of the conveyor belt 1 to be manufactured. As visible in FIG. 2, the grooves 4 have been formed for example by means of a U-shaped heating blade system, by trimming or by any other similar technique, vertically above a rib 1c. They can also be produced by removing material directly in the rib 1c itself, or, in the case of a sufficiently thick conveyor belt, between two ribs 1c. They define, in each end, the future locations of the transversal passages 8 arranged for receiving each a locking rod 3. The removed material strips 5 are preferably retained in order to be reused in a further step of the present process, which will be described later.

Figure 3:
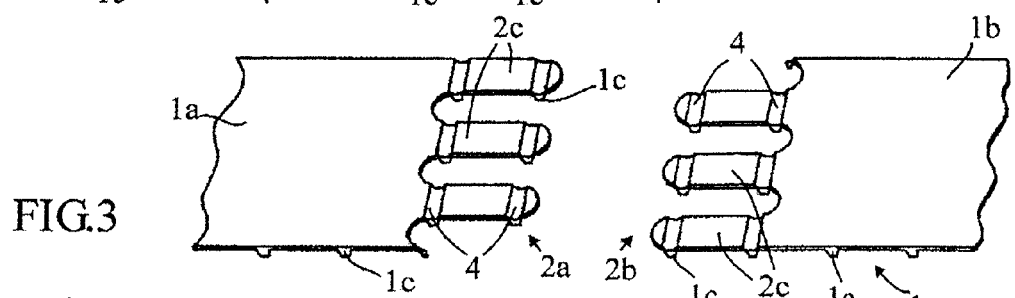

In accordance with FIG. 3, the teeth 2c forming the serrations 2a, 2b are then cut in the respective ends 1a, 1b, for example by die-stamping or any other similar technique, so that the serrations 2a, 2b be complementary in order to allow fitting them into each other, and so that each of them integrates the two grooves 4 machined previously. Of course, the shape and number of teeth 2c of each serration 2a, 2b may vary and are adapted as well in function of the nature of the conveyor belt as of the mechanical characteristics required for the future junction. A mechanical reinforcement of the junction can thus be achieved by increasing the number of teeth 2c of each serration 2a, 2b.

Figure 4:
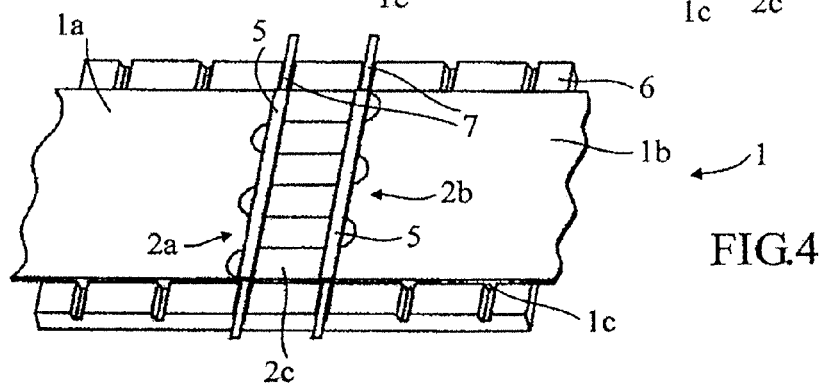
Figure 5:
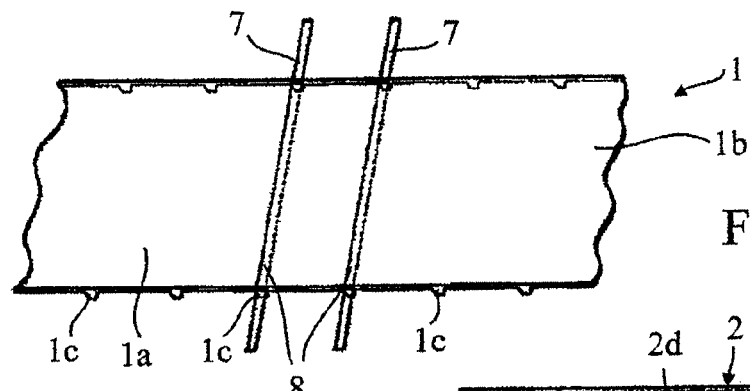
Figure 6:
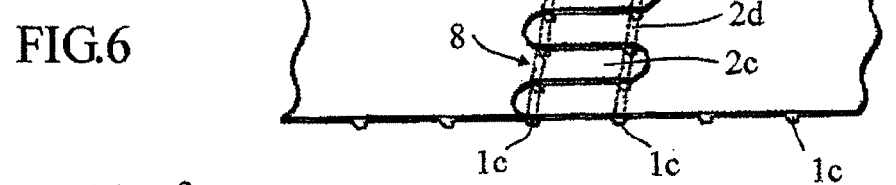

FIG. 4 illustrates a following step of the present process, in which the serrations 2a, 2b have been fitted together, and both ends 1a, 1b have been placed in a matrix 6 defining the impression of the conveyor belt 1. In compliance with the invention, a transversal core pin 7 having identical shape and dimensions as a locking rod 3 is then disposed in each groove 4, then covered with new material or, preferably, with the material stripes 5 removed previously. After the polymerization of the material, for example by heat fusion under a press, both ends 1a, 1b of conveyor belt 1 are perfectly welded and the two transversal core pins 7 are embedded in the thickness of the conveyor belt 1 (refer to FIG. 5). After removing these transversal core pins 7, two transversal passages 8 arranged for receiving each a locking rod 3 are set free in the thickness of conveyor belt 1. As represented in FIG. 6, the teeth of the two serrations 2a, 2b are then cut again, for example by die-stamping, and preferably at the exact location of the first cut, using the same stamping die. Such an approach is particularly advantageous in the case of a conveyor belt with a traction core, in which cutting the internal wires in several locations must imperatively be avoided.

Figure 7:
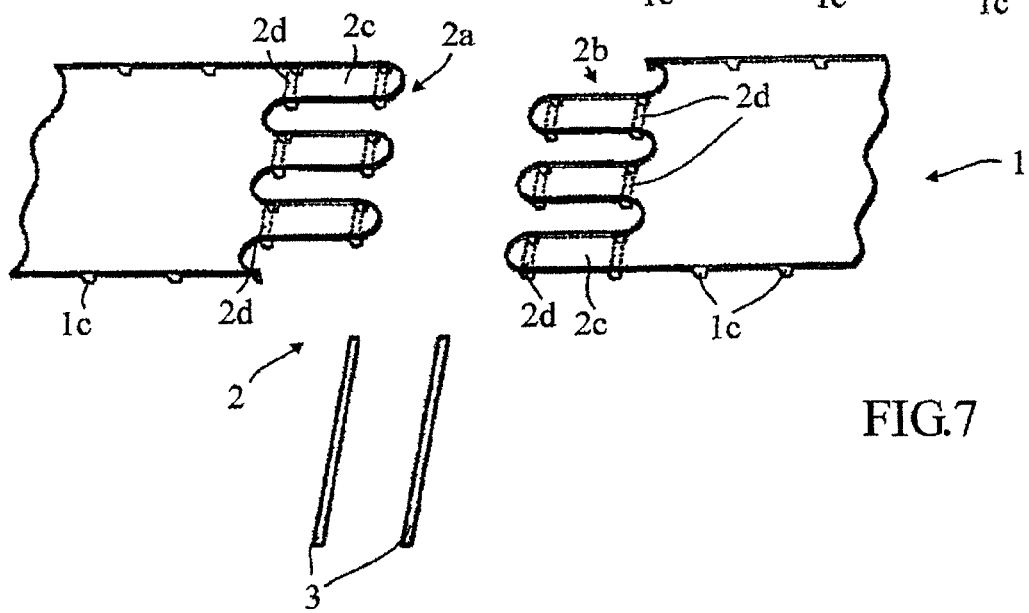

Finally, the implementation of the present process allowed manufacturing a conveyor belt 1 comprising junction means 2 directly integrated in both ends 1a, 1b to be assembled for forming a closed loop. As visible in FIG. 7, each end 1a, 1b comprises now a serration 2a, 2b that is complementary of that of the other end 1a, 1b, and of which all teeth 2c are crossed by two transversal openings 2d that are parallel with each other. These ends 1a, 1b can thus be assembled and dismounted at will, by inserting or removing two locking rods 3 through the transversal openings 2d. Furthermore, the fact of having made the rows of orifices 2d directly vertically above the ribs 1c allows advantageously to avoid any untimely lengthening of the pitch of the ribs at the assembled ends 1a, 1b and to guarantee the perfect meshing of the conveyor belt with the driving pulleys over time.

Of course, according to other variants of the present process, the number of grooves 4 machined can be different and adapted to the number of locking rods 3. One could also consider machining only one groove 4 with a width approximately equal to the length allowed for the teeth 2c, then placing in it as much transversal core pins 7 as required for making the desired number of rows of transversal openings 2d. Likewise, it is possible to cut the teeth before making the transversal openings 2d or at other moments during the process.

POSSIBILITIES OF INDUSTRIAL APPLICATION

This description shows clearly that the invention allows reaching the goals defined, that is to say to offer a fast and accurate process for manufacturing assembly means in both ends of material bands directly integrated into the ends. The process according to the invention presents furthermore the advantage of being applicable to any kind of material bands, with a textile core, with an external structure, or without ribs, while improving their final aesthetic aspect by avoiding the need of additional assembly means.

The present invention is not restricted to the example of embodiment described, but extends to any modification and variant which is obvious to a person skilled in the art while remaining within the scope of the protection defined in the attached claims.

The invention claimed is:
1. A process of manufacturing a looped material band (1) in which ends of the band are assembled by fitting together two serrations (2a, 2b) having complementary shapes provided respectively in a plane of each of the ends (1a, 1b), and teeth (2c) of each serration (2a, 2b) comprising at least one transversal opening (2d) that is aligned with the at least one transversal opening (2d) of neighboring teeth (2c) so as to define, when the serrations (2a, 2b) are fitted together with one another, at least one transversal passage (8) for receiving at least one locking rod (3) of a junction, the process comprising the steps of:
- machining the ends (1a, 1b) of the band (1) to remove material in an area corresponding at least to the transversal openings (2d) to be produced;
- cutting the teeth (2c) to form the serrations (2a, 2b) after machining the ends (1a, 1b) of the material band (1);
- fitting the serrations (2a, 2b) with one another;
- disposing a transversal core pin (7) in each machined area;
- overmolding material in the machined area to restore the ends (1a, 1b) of the band (1);
- removing each transversal core pin (7), forming each transversal opening (2d), after polymerization of the material;
- separating the serrations (2a, 2b) by die-stamping after the overmolding step; and
- stamping the material band (1) at an exact location where the serrations (2a, 2b) were previously cut using the same stamping die.

2. The process according to claim 1, further comprising the step of machining the ends (1a, 1b) of the band (1) on a width covering several rows of the transversal openings (2d).

3. The process according to claim 1, further comprising the step of machining the ends of the band by trimming.

4. The process according to claim 1, further comprising the step of machining the ends of the band with a heated blade.

5. The process according to claim 1, further comprising the step of utilizing the removed material as a material to be overmolded in the machined area.

6. The process according to claim 1, further comprising the step of overmolding the material, in the machined area by locating the ends (1a, 1b) in a matrix (6) defining an impression of the material band (1).

7. The process according to claim 1, further comprising the step of cutting the teeth (2c) forming the serrations (2a, 2b) by die-stamping, before the overmolding step.

8. The process according to claim 1, further comprising the step of forming two parallel spaced apart transversal passages (8) when the serrations (2a, 2b) are fitted together, and each passage (8) receiving at least one locking rod (3) of a junction.

9. The process according to claim 1, further comprising the step of forming two parallel grooves (4) in the teeth (2c).

10. The process according to claim 1, further comprising the step of forming the teeth such that each tooth (2c) is of unitary construction with a respective one of the ends of the band (1a, 1b).

11. The process according to claim 1, further comprising the step of forming the teeth such that each tooth (2c) is directly integrated in a respective one of the ends of the band (1a, 1b).

* * * * *